US010873230B2

(12) United States Patent  
Khokhar (10) Patent No.: US 10,873,230 B2  
(45) Date of Patent: Dec. 22, 2020

(54) AMORTISSEUR ASSEMBLY EXTENDED SERVICE LIFE UPGRADE FOR SALIENT POLE SYNCHRONOUS MOTORS

(71) Applicant: New York Power Authority, White Plains, NY (US)

(72) Inventor: Asif Khokhar, Valley Stream, NY (US)

(73) Assignee: New York Power Authority, White Plains, NY (US)

(*) Notice: Subject to any disclaimer, the term of this patent is extended or adjusted under 35 U.S.C. 154(b) by 551 days.

(21) Appl. No.: 15/228,452

(22) Filed: Aug. 4, 2016

(65) Prior Publication Data

US 2018/0041084 A1 Feb. 8, 2018

(51) Int. Cl.  
*H02K 3/20* (2006.01)

(52) U.S. Cl.  
CPC .................... *H02K 3/20* (2013.01)

(58) Field of Classification Search  
CPC ......... H02K 3/20; H02K 19/14; H02K 19/02; H02K 1/18; H02K 9/04; H02K 19/38; H02K 19/16; H02K 9/06; H02K 1/27; H02K 3/24; H01R 13/73  
USPC .................. 310/183, 211, 269; 439/557  
See application file for complete search history.

(56) References Cited

U.S. PATENT DOCUMENTS

| | | | |
|---|---|---|---|
| 3,459,979 A * | 8/1969 | Carew ................. | H02K 3/20 310/54 |
| 7,504,756 B2 * | 3/2009 | Caprio ............... | H02K 17/165 310/211 |
| 2006/0141858 A1* | 6/2006 | Phung ................ | H01R 13/5202 439/557 |
| 2013/0181568 A1* | 7/2013 | Bangura ............. | H02K 3/16 310/183 |
| 2014/0028141 A1* | 1/2014 | DuVal ................ | H02K 15/09 310/183 |
| 2014/0103774 A1* | 4/2014 | Rasmussen .......... | H02K 3/20 310/183 |
| 2016/0208526 A1* | 7/2016 | Cheng ................ | E05B 65/0858 |

* cited by examiner

*Primary Examiner* — Tran N Nguyen  
*Assistant Examiner* — Leda T Pham  
(74) *Attorney, Agent, or Firm* — Bond Schoeneck & King, PLLC; George McGuire (57) ABSTRACT

The present invention is an amortisseur upgrade which augments features of the traditional amortisseur. By introducing four features, the aggressive differential thermal growth, due to an excessive power onrush, beyond the intended design duty, during generator startup, is managed. The upgrades include: shallow clearance counter-bores in the generator end cap, flexible shorting plates, hollow damper rod ends, and spacers which are integrated into the shorting plates. These features, when implemented into the traditional amortisseur, manage the aggressive thermal growth response of the amortisseur assembly.

19 Claims, 11 Drawing Sheets

AMORTISSEUR ASSEMBLY EXTENDED SERVICE LIFE UPGRADE FOR SALIENT POLE SYNCHRONOUS MOTORS

BACKGROUND OF THE INVENTION

1. Field of the Invention

The present disclosure is directed generally to synchronous motor components, and more particularly, to an amortisseur assembly for a salient pole synchronous motor which operates beyond the intended design duty.

2. Description of the Related Art

Synchronous motors are not self-starting and require an external agent to reach synchronous speed. However, a synchronous motor can be started with electromagnetic induction techniques by introducing an amortisseur winding onto the rotor. The workings of an induction motor are accurately described by the well-known Faraday's law of electromagnetic induction and the Lorentz force. While the rotor is locked, the stator connects to a three phase power source. The three phase power source produces a rotating magnetic field in the stator. Rotating magnetic flux created by the stator cuts through the amortisseur winding and induces an alternating current therein. As the damper rods of an amortisseur rack are short circuited by shorting plates, an enormous amount of circulating current is developed in the damper rods and shorting plates. The circulating current is nearly identical in all damper rods thus creating a continuous torque about the generator bearing and pulling the rotor in the direction of the revolving field.

The circulating current passing through the system ultimately causes the metal temperature of the amortisseur winding to rise. The current is strong when the rotor is at a standstill, but completely evacuates the system when the rotor reaches synchronous speed. Therefore, the current in the amortisseur winding has a high frequency and inductive reactance at the onset, which generates a massive amount of heat. This heat causes the bimetallic system to grow differentially. Conventional amortisseur windings are designed to withstand heat due to high induced current for short time intervals. However, when more operating time is taken than the designated time which is required to bring the generator to synchronous speed, the amortisseur windings tend to overheat causing excessive thermal differential growth that leads to severe fatigue damage of the material surrounding the braze joints.

Historically, large generator units, such as those used in power plants, experience excessive shorting plate failure. The shorting plates are brazed to the cylindrical damper rod ends after the damper rods are slid into holes placed through the rotor end cap. This arrangement constrains the damper rods to the rotor end caps—such that the rods are free to grow primarily along the vertical direction relative to the end caps—while the shorting plates are bonded to the damper rod ends.

The local dilatational thermal growth of the brass damper rods puts the copper shorting plate into a state of elevated tension in the region surrounding the bond joints. The shorting plates are subject to bending stress too as the vertical growth of the damper rods is non-uniform along the major length of the shorting plate. This non-uniform thermal growth is appreciable near the leading and trailing ends of the shorting plates and overstresses the copper surrounding these end joints. To a lesser extent, the rpm load due to the spinning rotor also acts on the amortisseur winding thereby contributing more bending stress to the bond joints.

Now, the end caps remain relatively cool compared to the warm shorting plates during the onrush of power. As the shorting plate heats up, it grows thermally along the direction perpendicular to its cross-section such that the thermal growth is symmetric about the shorting plate center. The hot damper rod sections get tugged by the significant growth of the shorting plate; while—inches away—the damper rod material, confined by the relatively cool end caps remains quasi-static. This relative growth imposed on the damper rods aggravates the stresses in the bond joint and surrounding shorting plate material.

The combined stresses acting on the bond joints cause severe damage to the bonded shorting plate material during generator start-up, chronically. Damage accumulates after cycling the bonded joints through excessive stress levels and eventually initiates cracks in the material surrounding the bonded joints. The initiated cracks propagate until the material surrounding the bond joints break. The cracks may even break the shorting plate into pieces.

Accordingly, there is a need in the art for an improved amortisseur winding that reduces the stress on the system thereby increasing its service life.

Description of the Related Art Section Disclaimer: To the extent that specific patents/publications/products are discussed above in this Description of the Related Art Section or elsewhere in this Application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

Embodiments of the present invention recognize that there are potential problems and/or disadvantages with the conventional amortisseur windings as described above. Therefore, a need exists for an amortisseur assembly which reduces stress on the system thereby increasing its service life. Various embodiments of the present invention may be advantageous in that they may solve or reduce one or more of the chronic problems and/or disadvantages discussed herein.

The present disclosure is directed to an inventive configuration, structure, and resulting function of an amortisseur assembly for a salient pole synchronous motor. Various embodiments herein are directed to an amortisseur assembly, including, but not limited to a shorting plate having a first surface and a second surface extending horizontally between a pair of ends; a plurality of apertures extending from the first surface to the second surface; wherein each of the apertures has a circumference on the second surface; and an appendage protruding vertically from the circumference on the second surface; wherein the aperture extends through the appendage; wherein each appendage has a first region and a second region; wherein the first region connects the appendage to the second surface and the second region is tapered.

According to an alternative embodiment, the amortisseur assembly includes, but is not limited to a pair of curved shorting plates having a first surface and a second surface extending horizontally between a pair of ends; a plurality of apertures extending from the first surface to the second surface; wherein each of the apertures has a circumference on the second surface; an appendage protrudes vertically from the circumference on the second surface; wherein the aperture extends through the appendage; wherein each appendage has a first region and a second region; wherein the first region connects the appendage to the second surface and the second region is tapered; an opening in at least one end of each shorting plate; wherein the opening extends from the first surface to the second surface; and a plurality of damper rods extending between the curved shorting plates.

According to an another embodiment, the amortisseur assembly includes, but is not limited to a pair of curved plates having a first surface and a second surface extending horizontally between a pair of ends; a plurality of apertures extending from the first surface to the second surface; wherein each of the apertures has a circumference on the second surface; an appendage protruding vertically from the circumference on the second surface; wherein the aperture extends through the appendage; wherein each appendage has a first region and a second region; wherein the first region connects the appendage to the second surface and the second region is tapered; an opening in at least one end of each plate; wherein the opening extends from the first surface to the second surface; a plurality of parallel solid rods extending between the curved plates; wherein the rods are connected within the apertures of the curved plates; wherein each rod has a pair of ends, each end comprising an end cap; and a counter bore in each end cap.

BRIEF DESCRIPTION OF THE DRAWINGS

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments.

Reference is now made briefly to the accompanying drawings, in which.

Where applicable, like reference characters designate identical or corresponding components and units throughout the several views, which are not to scale unless otherwise indicated. Moreover, the embodiments disclosed herein may include elements that appear in one or more of the several views or in combinations of the several views.

DETAILED DESCRIPTION

Figure 1:
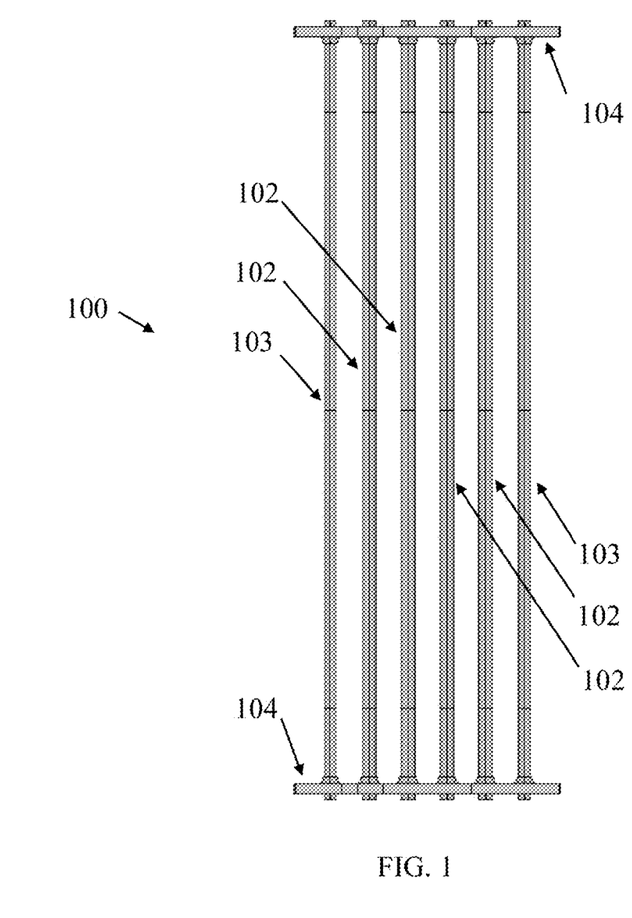
FIG. 1 is a perspective view of an amortisseur assembly.

Referring now to the drawings, wherein like reference numerals refer to like parts throughout, FIG. 1 shows a perspective view of an amortisseur assembly 100. The depicted embodiment of an amortisseur assembly 100 comprises a plurality of damper rods 102, 103 extending between a pair of shorting plates 104. In the depicted embodiment, the damper rods 102, 103 are parallel to each other.

Figure 2:
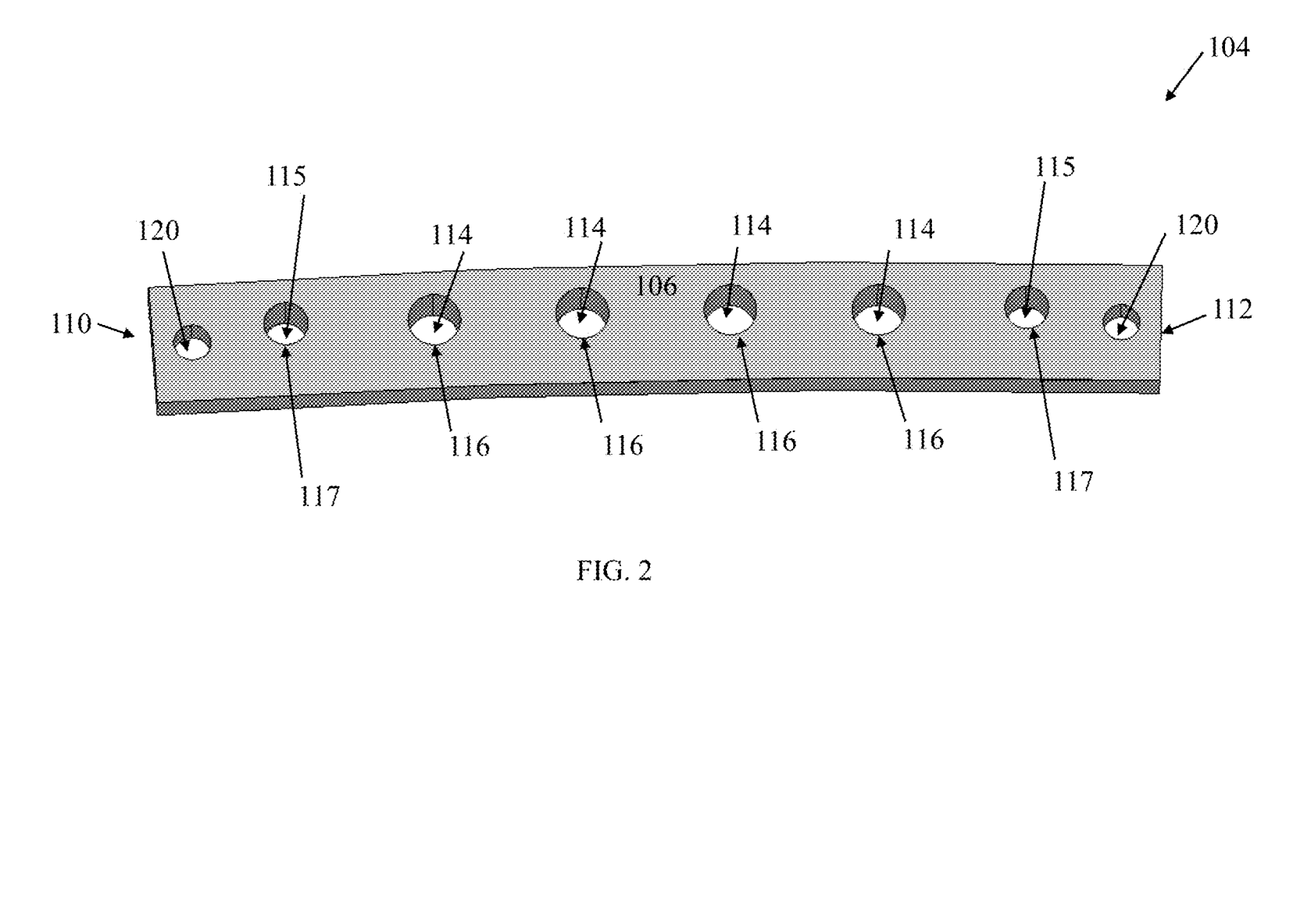
FIG. 2 is a perspective view of the first surface of the shorting plate.
Figure 3:
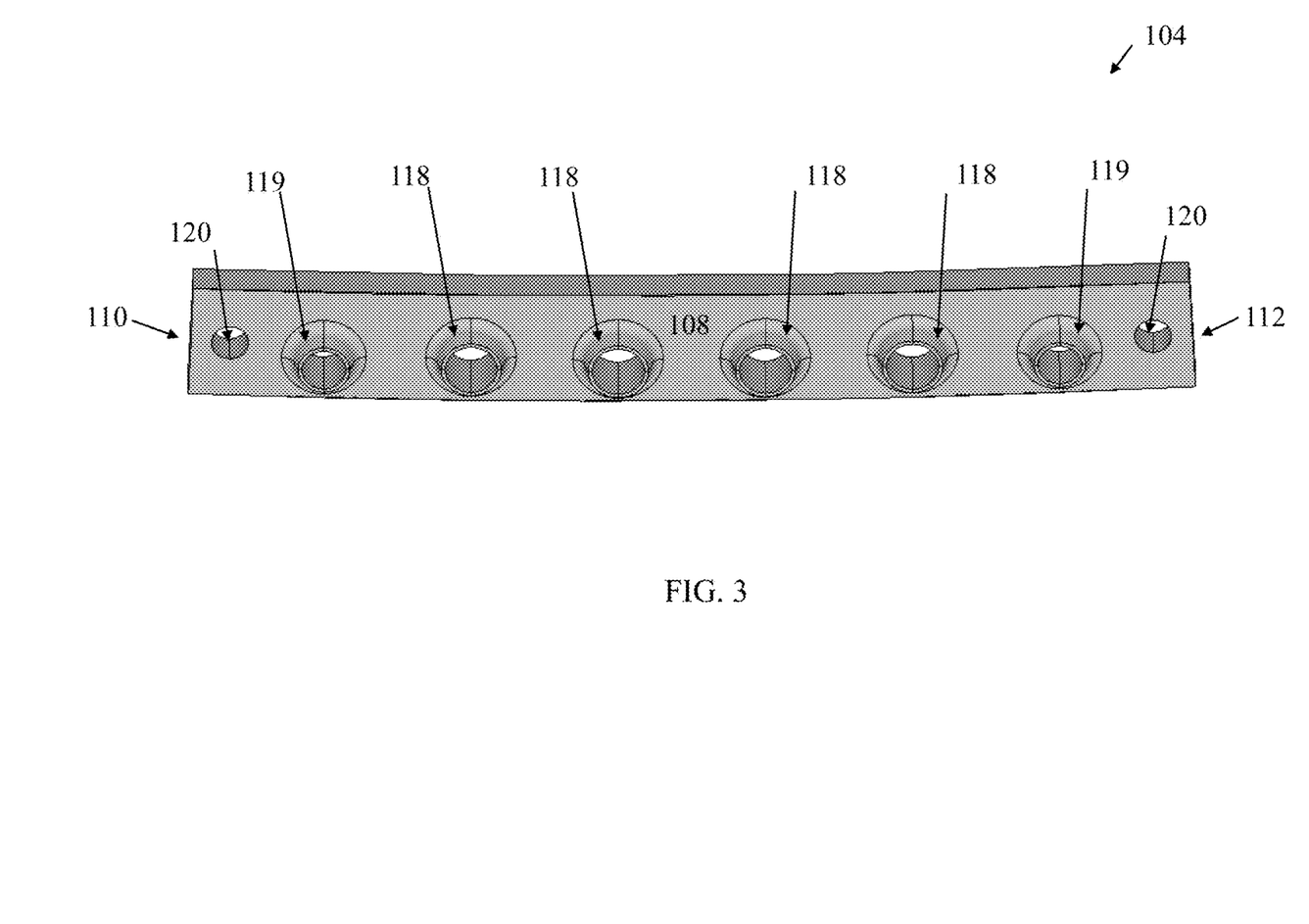
FIG. 3 is a perspective view of the second surface of the shorting plate.

Referring now to FIGS. 2 and 3, there are perspective views of a first surface 106 and a second surface 108 of the shorting plate 104, respectively. Referring now to FIG. 2, the shorting plates 104 of the amortisseur assembly 100 comprise a first surface 106 and a second surface 108, the second surface 108 shown in FIG. 3. The first surface 106 and the second surface 108 extend horizontally between a pair of ends 110, 112 such that the shorting plate 104 has a rectangular cross-section. In the embodiment shown in FIG. 2, the shorting plate 104 is curved. The curvature reduces the stress that accumulates in the shorting plate 104 during the generator start-up.

The shorting plate 104 has a plurality of apertures 114, 115 extending from the first surface 106 to the second surface 108. The apertures 114, 115 have a circumference 116, 117 on the second surface 108 wherein a hollow appendage 118, 119 protrudes vertically therefrom. In one embodiment, the appendages 118, 119 are machined directly into the shorting plate 104 such as to effectively create a collar—or spacer—integral with the shorting plate 104. As shown in FIG. 3, the apertures 114, 115 extend from the first surface 106 through the appendages 118, 119. Therefore, to create the amortisseur assembly, the rods are inserted through the hollow appendages 118, 119 and the apertures 114, 115 as shown in FIG. 1.

FIGS. 2 and 3 also depict an embodiment further comprising one or more openings 120 near the ends 110, 112 of the shorting plate 104. The openings 120 extend from the first surface 106 through the shorting plate 104 to the second surface 108. The openings 120 are configured to facilitate connection of one amortisseur assembly to another. It is contemplated that flexible copper connector stubs or like connectors can be used to join two amortisseur assemblies together at each pole of the generator, forming a cage thereon.

Figure 4:
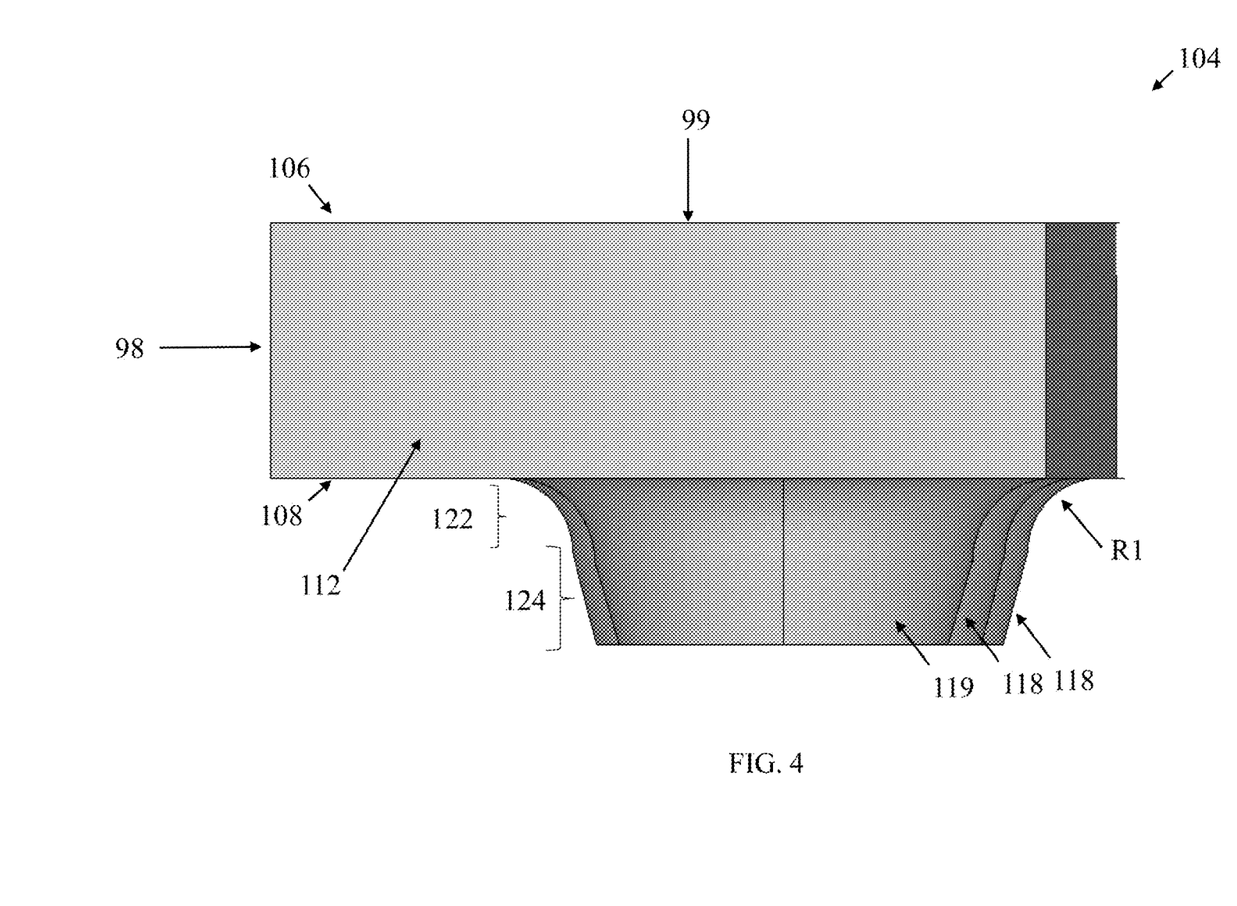
FIG. 4 is a side view of the shorting plate.

Referring now to FIG. 4, there is shown a side view of the shorting plate 104. Each appendage 118, 119 has a first region 122 and a second region 124. In the depicted embodiment, the first region 122 connects the appendage 118, 119 to the shorting plate 104. As shown in the embodiment depicted in FIGS. 3 and 4, the first region 122 is cylindrical and hollow with a smooth transition—or simple fillet with a radius $R_1$—between the appendage and the second surface 108. Also shown in FIG. 3, the second region 124 is similarly cylindrical and hollow. The appendages 118, 119 facilitate the insertion of the damper rods 102, 103 as the damper rods 102, 103 are also similarly cylindrical.

Also shown in FIG. 4, the appendage 118, 119 is tapered in the second region 124 such that the tapered second region 124 forms a hollow conical shape. The appendage 118, 119 controls the distance between second surface 108 and the end cap (not shown) as the surface of the appendage 118, 119 farthest away from second surface 108 rests loosely and flat on the end cap surface. The height 98 and width 99 are dimensions defining the uniform rectangular cross-sectional area at the ends 110, 112 of shorting plate 104. The height 98 can be reduced while the width 99 is increased such that the overall section area of shorting plate 104 remains constant, nearly. Reducing the height reduces the thermal stress in the shorting plate 104. Increasing the width 99 maintains a uniform current density through the shorting plate 104 and also fortifies the shorting plate 104 in the event that a fatigue crack develops along the width 99.

Figure 5:
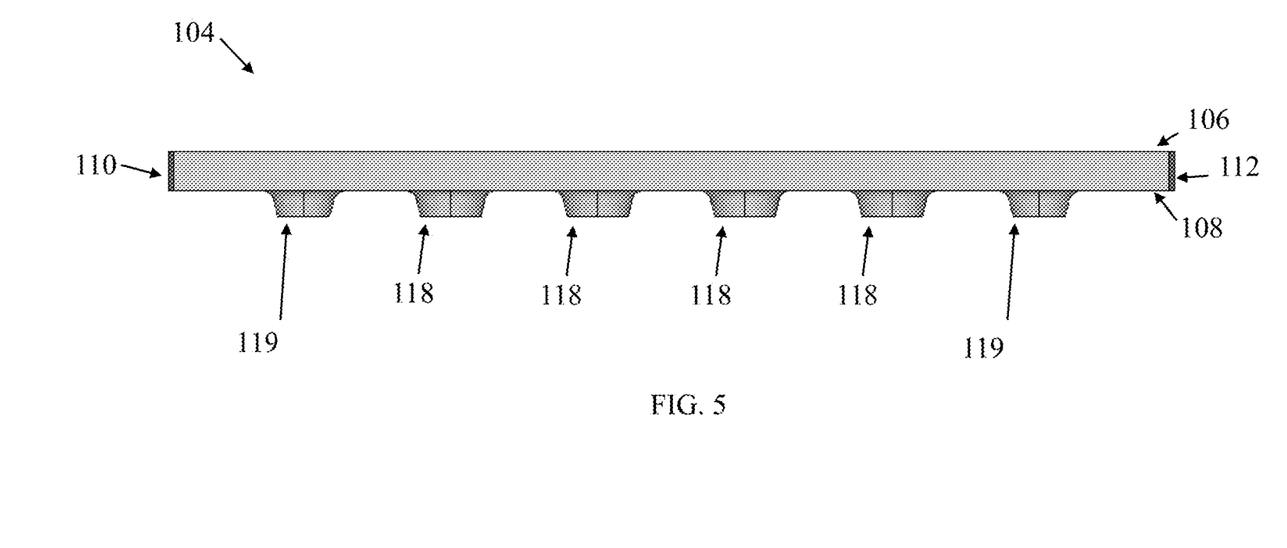
FIG. 5 is a perspective view of the shorting plate.

Referring now to FIG. 5, there is shown a perspective view of the shorting plate 104. In the depicted embodiment, the appendages 118, 119 are axisymmetric and equally spaced along the plate. Axisymmetric appendages 118, 119 better accommodate similarly shaped cylindrical damper rods 102. Further, equal spacing of the appendages 118, 119 along the shorting plate 104 aids in lowering the stress level on the shorting plate 104. However, as shown in FIG. 2, the apertures 114, 115 do not need to be aligned across the plate 104 nor equally sized. In some embodiments, the apertures 114, 115 are not aligned in order to accommodate the cylindrical shape of a generator.

Figure 6:
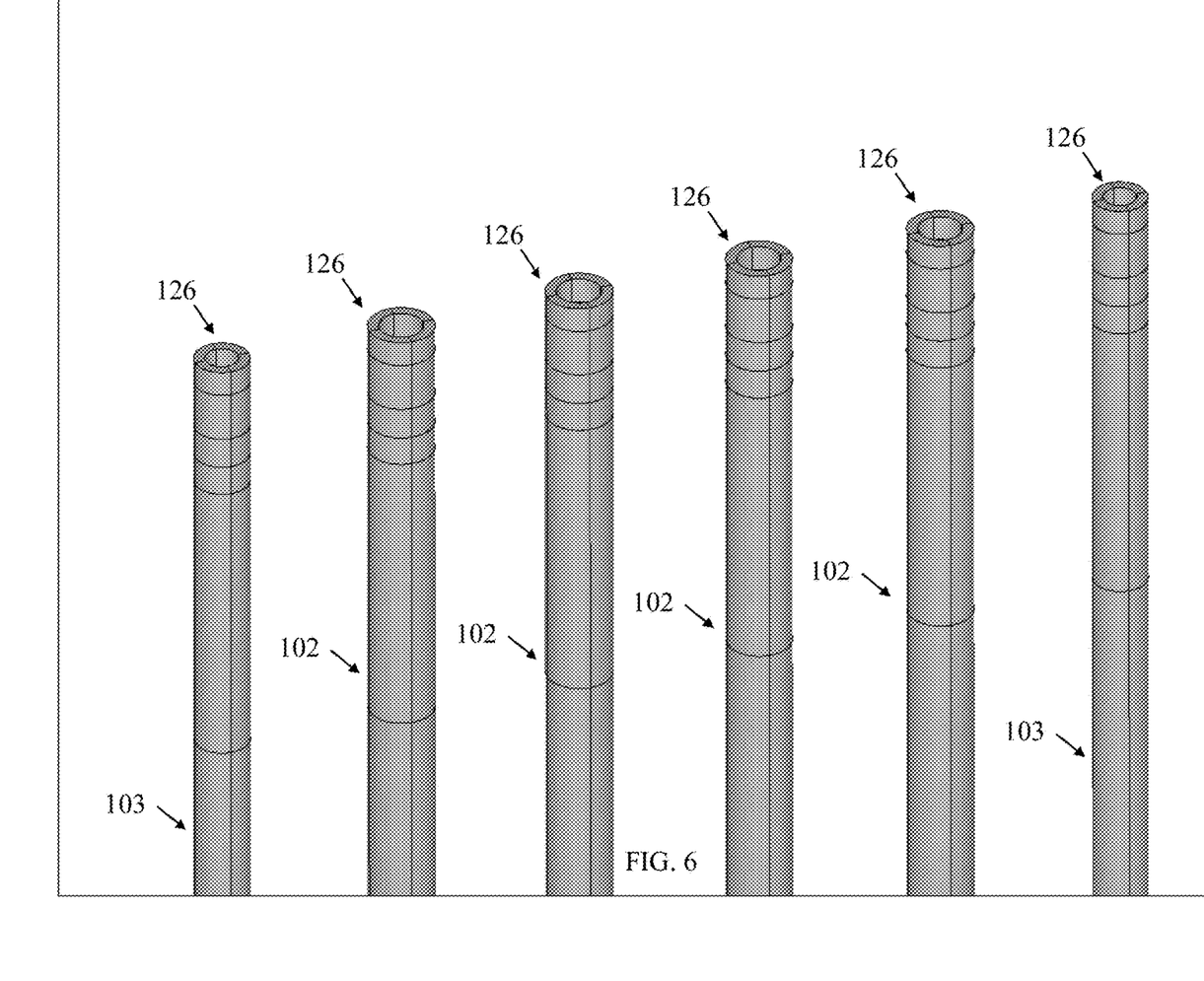
FIG. 6 is a perspective view of the damper rods.
Figure 7:
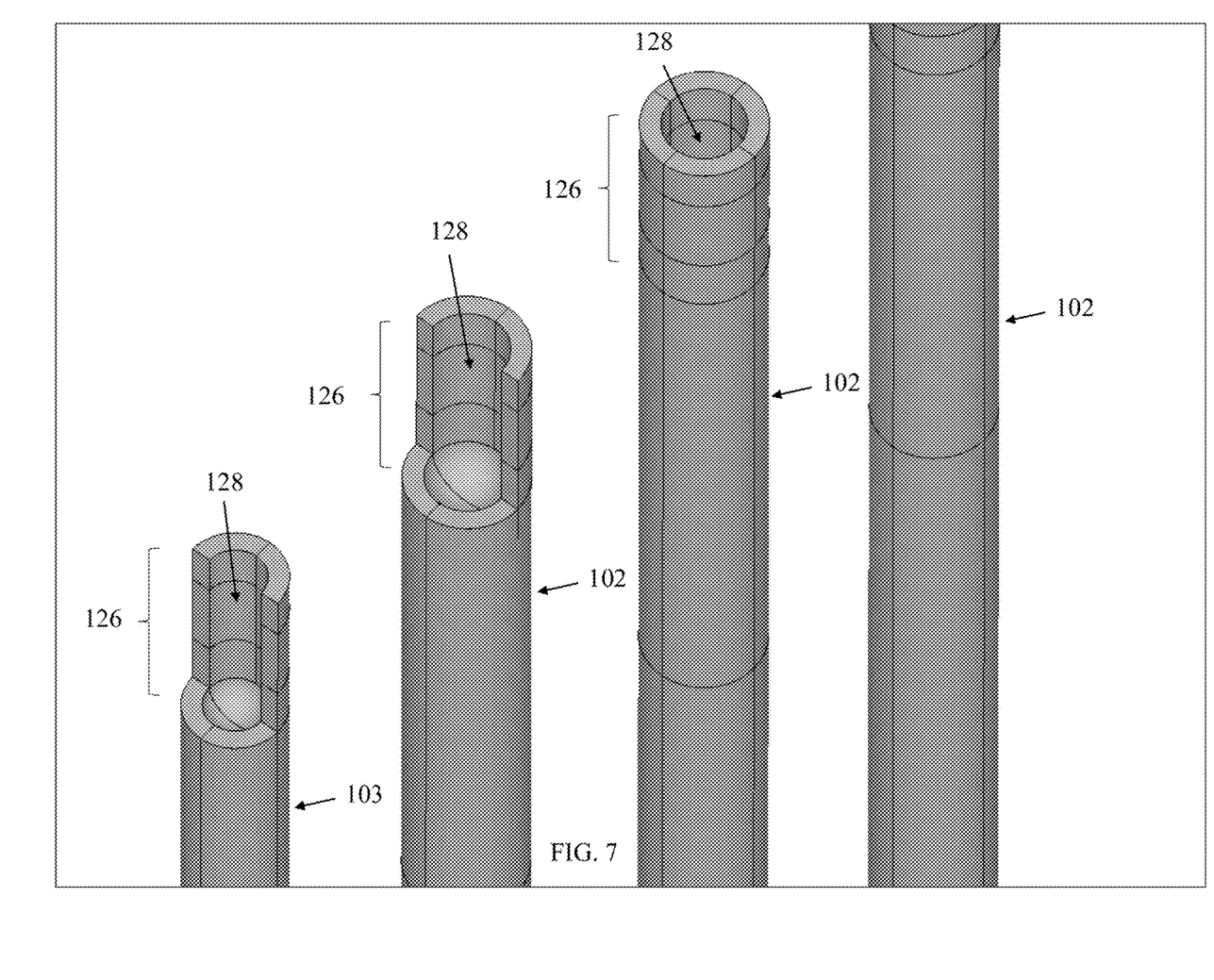
FIG. 7 is a cut-away view of the ends of the damper rods.
Figure 8:
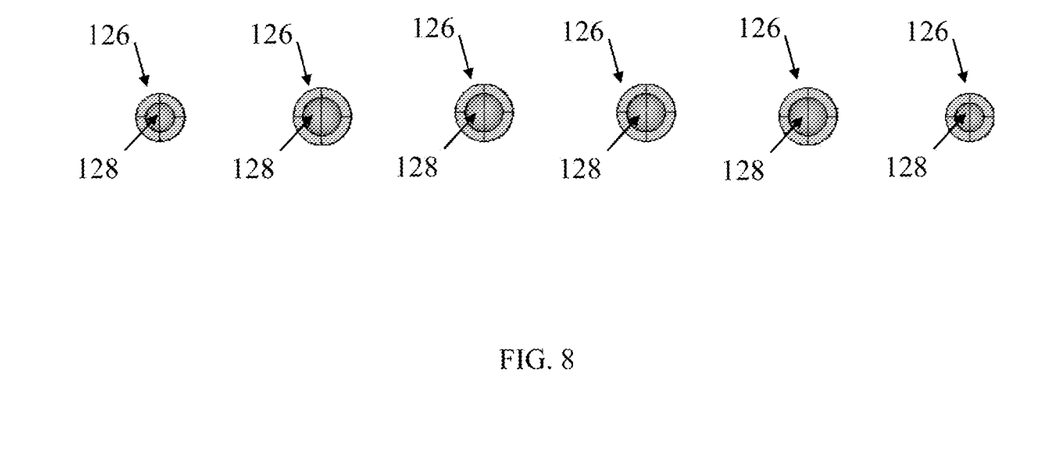
FIG. 8 is an overhead view of the counter bores in the ends of the damper rods.

FIGS. 6, 7, and 8 show various views of the damper rods 102, 103 of the amortisseur assembly 100. Referring now to FIG. 6, there is shown a perspective view of the damper rods 102, 103. The damper rods 102, 103 are cylindrical and composed of electron-transporting material such that damper rods 102, 103 can carry a current. For example, the damper rods 102, 103 can be composed of brass. The lengths of the damper rods 102, 103 are solid to conduct the induced current at a high frequency.

Each damper rod 102, 103 has a pair of ends 126. Referring now to FIG. 7, there is a cut-away view of the ends 126 of the damper rod 102, 103. Each end 126 comprises a vertical region of the damper rod 102, 103 having a shallow counter bore 128 extending therethrough. The counter bore 128 extends from the exterior of the damper rod 102, 103 to just below the shorting plate 104 second surface 108. FIG. 8 shows an overhead view of the counter bores 128 in the ends 126 of the damper rods 102, 103. The hollow ends 126 of the damper rods 102, 103 provide additional space to accommodate the local radial thermal growth of the hot damper rods 102, 103. Thus, the ends 126 of the damper rods 102, 103 permit a reduced local stiffness to improve compliance at the brazed joint interface and surrounding shorting plate 104 material.

Figure 9:
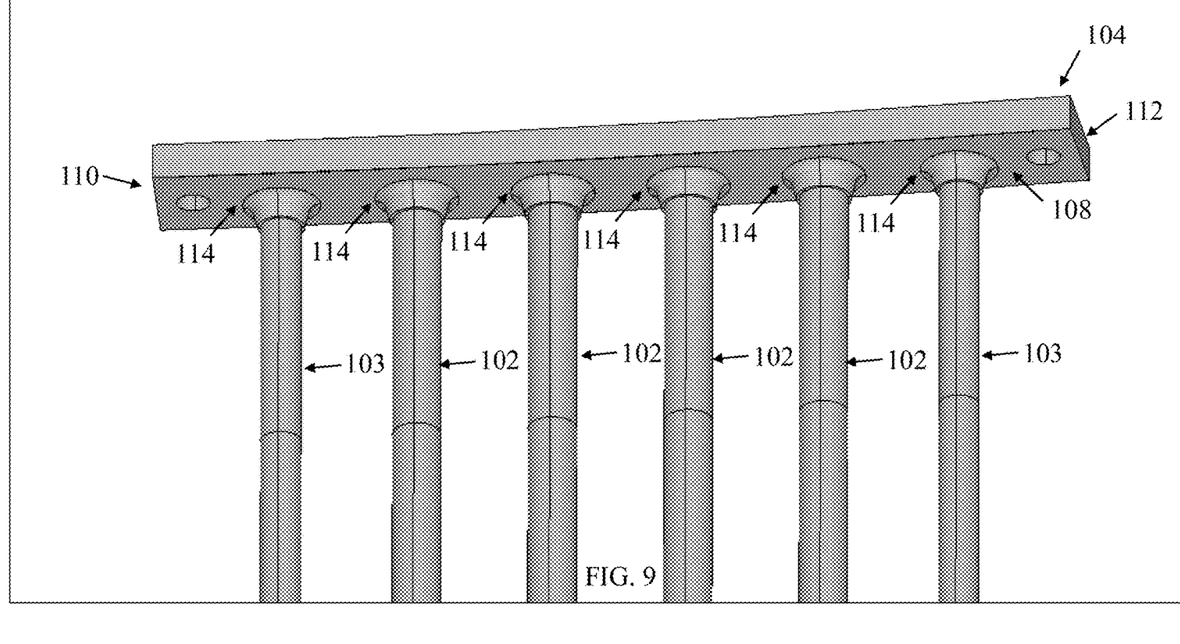
FIG. 9 is a perspective view of the second surface of the shorting plate with damper rods connected thereto.
Figure 10:
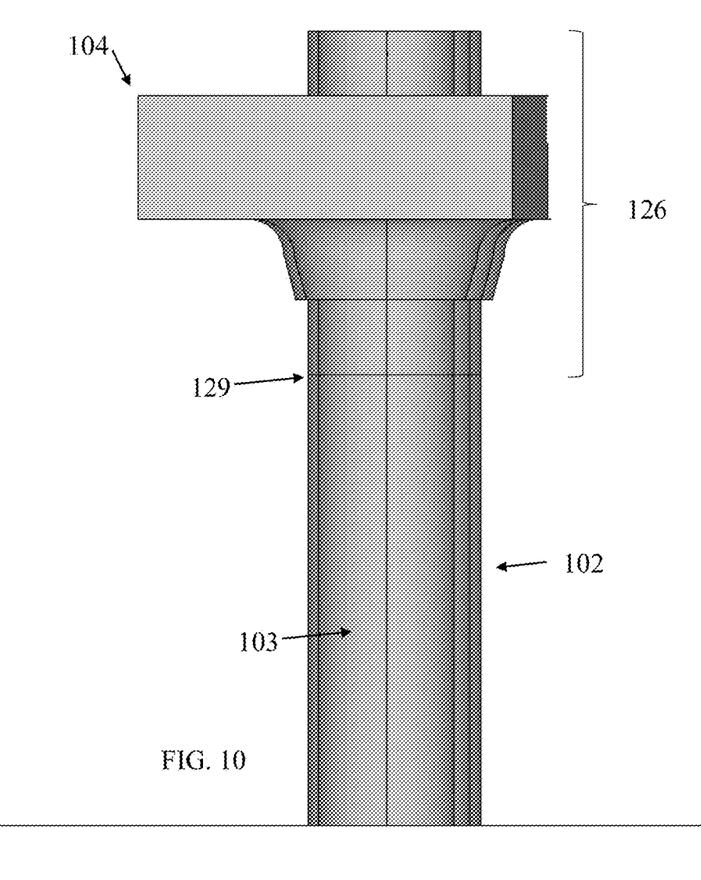
FIG. 10 is a close-up view of a damper rod connected through an aperture of the shorting plate.
Figure 11:
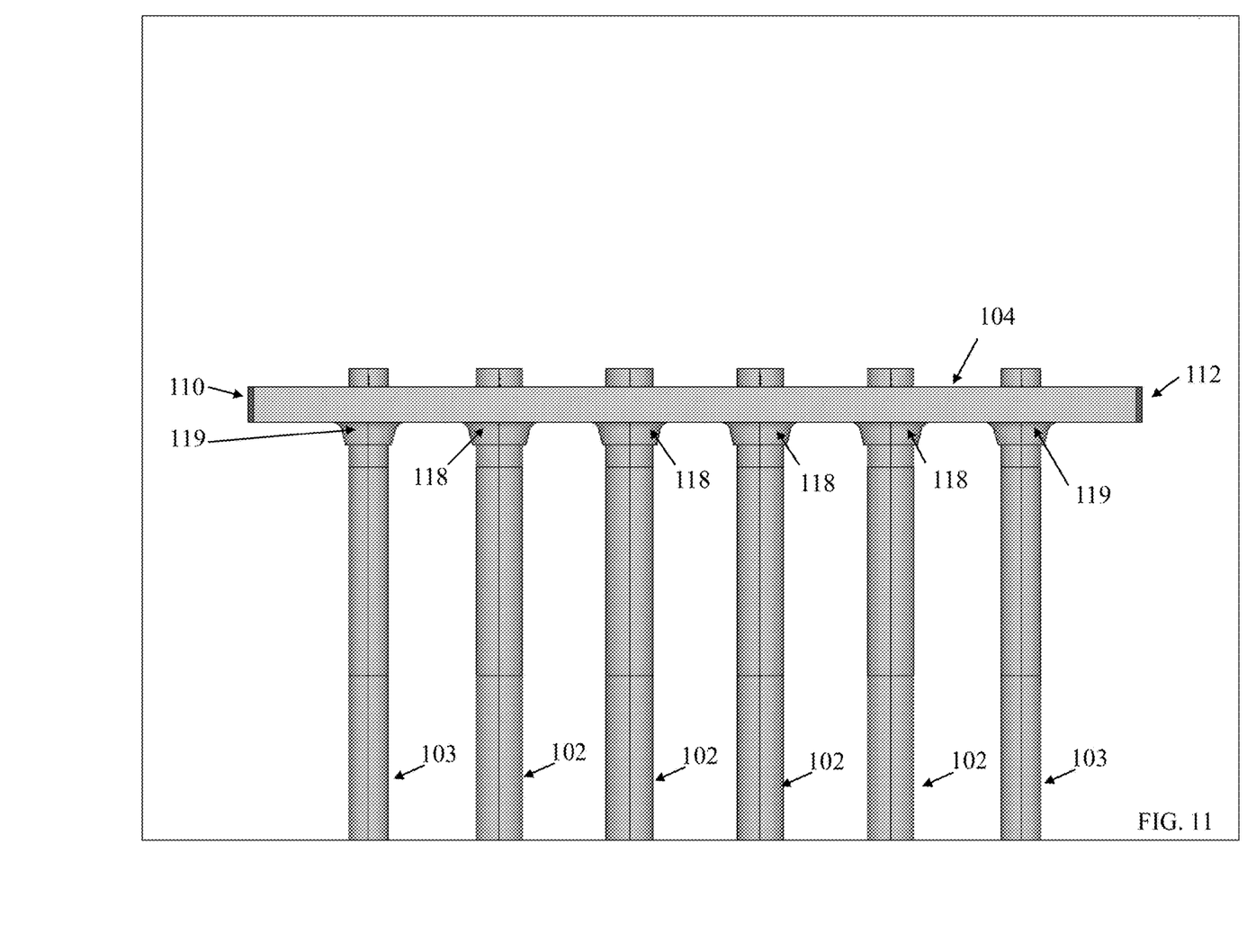
FIG. 11 is a perspective view of the shorting plate with damper rods connected therein.

FIGS. 9, 10, and 11 show various views of the shorting plate 104 with the damper rods 102, 103 connected thereto. The appendages 118, 119 function as a collar around the damper rods 102, 103. The appendages 118, 119 act as a loose pilot between the second surface 108 of the shorting bar 104 and the end cap (not shown) of the rotor pole. Referring to FIG. 9, there is shown a perspective view of the second surface 108 with damper rods 102, 103 that are bonded to the shorting plate 104. The damper rods 102, 103 are inserted through the apertures 114, 115 and then through the holes in the end cap (not shown) into the opposite shorting plate 104. Then, the damper rods 102, 103 are brazed to the shorting plates 104 at the bounding surfaces defining the apertures 114, 115. Before brazing, the fit between the shorting plate 104 and the damper rods 102, 103 allows for loose slippage between mating surfaces.

As seen more clearly in FIG. 10, a portion of the end 126 of the damper rod 102, 103 forms an interface of the shorting plate 104 that is brazed or otherwise connected at the bounding surface defining the apertures 114, 115. As mentioned above, this arrangement reduces thermal-mechanical stress on the shorting plate 104—in the bond region—under excessive generator start-up conditions. The counter bore 128 shown in FIGS. 7 and 8 allows the ends 126 of the rods 102, 103 to have increased compliance within the apertures 114, 115 of the shorting plate 104.

FIG. 11 shows a perspective view of the shorting plate 104 with damper rods 102, 103 bonded therein. In the depicted embodiment, the damper rods 102, 103 are parallel and extend vertically from the horizontal shorting plate 104. In the amortisseur assembly 100 shown in FIG. 1, the damper rods 102 extend vertically from one shorting plate 104 to the other shorting plate 104. As shown in FIG. 1, the apertures 114, 115 in the shorting plates 104 may be aligned such that the damper rods 102, 103 are parallel when they are bonded therein.

The surface on the appendages 118, 119 furthest from the second surface 108 of the shorting plate 104 rests flat on the end cap (not shown) surface. Holes through the end cap— one for each damper rod 102, 103—allow passage of the damper rods 102, 103 through the end caps (not shown) and act to confine the damper rods 102, 103; thus, the fit between the damper rods 102, 103 and the end cap allows for a slip with minimal friction during assembly. Since the shorting plate 104 grows along the direction perpendicular to the shorting plate 104 cross section, symmetrically with respect to the shorting plate 104 center, the material in the damper rods 102, 103 is tugged by the shorting plate 104 in the bonded region. Due to the confinement and relatively cool material temperature of the end cap, the portion of the damper rods 102, 103 within the end cap—below the appendages 118, 119—is essentially clamped therein. By introducing a counter bore 128 into the end cap, the ends 126 of the damper rods 102, 103 are unconfined. In doing so, the stress level is reduced in the shorting plate 104. FIG. 10 shows a line 129 on the damper rods 102, 103 that marks where the counter bore 128 in the end cap terminates.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. An amortisseur assembly for a salient pole synchronous motor, comprising:
   a shorting plate having a first surface and a second surface extending horizontally between a pair of ends;
   a plurality of apertures extending from the first surface to the second surface;
   wherein each of the apertures has a circumference on the second surface; and
   an appendage protruding vertically from the circumference on the second surface;
   wherein the aperture extends through the appendage;
   wherein each appendage has a first region and a second region;
   wherein the first region connects the appendage to the second surface and the second region is tapered away from the second surface.

2. The assembly of claim 1, further comprising an opening in at least one end of each plate wherein the opening extends from the first surface to the second surface.

3. The assembly of claim 1, wherein the first region is a fillet connecting the second surface to the second region.

4. The assembly of claim 1, wherein the plate has a rectangular area.

5. The assembly of claim 1, wherein the plate is curved.

6. The assembly of claim 1, wherein the appendage is axisymmetric.

7. An amortisseur assembly for a salient pole synchronous motor, comprising:
   a pair of curved shorting plates having a first surface and a second surface extending horizontally between a pair of ends;
   a plurality of apertures extending from the first surface to the second surface;
   wherein each of the apertures has a circumference on the second surface;
   an appendage protruding vertically from the circumference on the second surface;
   wherein the aperture extends through the appendage;
   wherein each appendage has a first region and a second region;
   wherein the first region connects the appendage to the second surface and the second region is tapered away from the second surface;
   an opening in at least one end of each plate;
   wherein the opening extends from the first surface to the second surface; and
   a plurality of damper rods extending between the curved plates.

8. The assembly of claim 7, wherein the rods are connected to the plates within the apertures.

9. The assembly of claim 8, wherein the apertures of one plate are aligned with the apertures of the other plate such that the rods are parallel.

10. The assembly of claim 7, wherein each rod has a pair of hollow ends.

11. The assembly of claim 10, further comprising a counter bore in each end of each rod.

12. An amortisseur assembly for a salient pole synchronous motor, comprising:
   a pair of curved shorting plates having a first surface and a second surface extending horizontally between a pair of ends;
   a plurality of apertures extending from the first surface to the second surface;
   wherein each of the apertures has a circumference on the second surface;
   an appendage protruding vertically from the circumference on the second surface;
   wherein the aperture extends through the appendage;
   wherein each appendage has a first region and a second region;
   wherein the first region connects the appendage to the second surface and the second region is tapered away from the second surface;
   an opening in at least one end of each plate;
   wherein the opening extends from the first surface to the second surface;
   a plurality of parallel solid damper rods extending between the curved plates;
   wherein the rods are connected within the apertures of the curved plates;
   wherein each rod has a pair of ends; and
   a counter bore in each end of each rod.

13. The assembly of claim 12, wherein each end of each rod is connected within the aperture of the plate.

14. The assembly of claim 12, wherein the appendages of one plate are tapered toward the appendages of the other plate.

15. The assembly of claim 12, wherein the first region of the appendage is a hollow cylindrical body.

16. The assembly of claim 12, wherein the second region of the appendage is a hollow cylindrical body.

17. The assembly of claim 12, wherein the appendages are axisymmetric.

18. The assembly of claim 12, wherein the ends of each rod are brazed to the plates within each aperture through the appendage.

19. The assembly of claim 12, wherein the rods are composed of conductive material.

* * * * *